W. H. JONES & B. HOLMES.
BOOK INDEX.
APPLICATION FILED JULY 18, 1910.

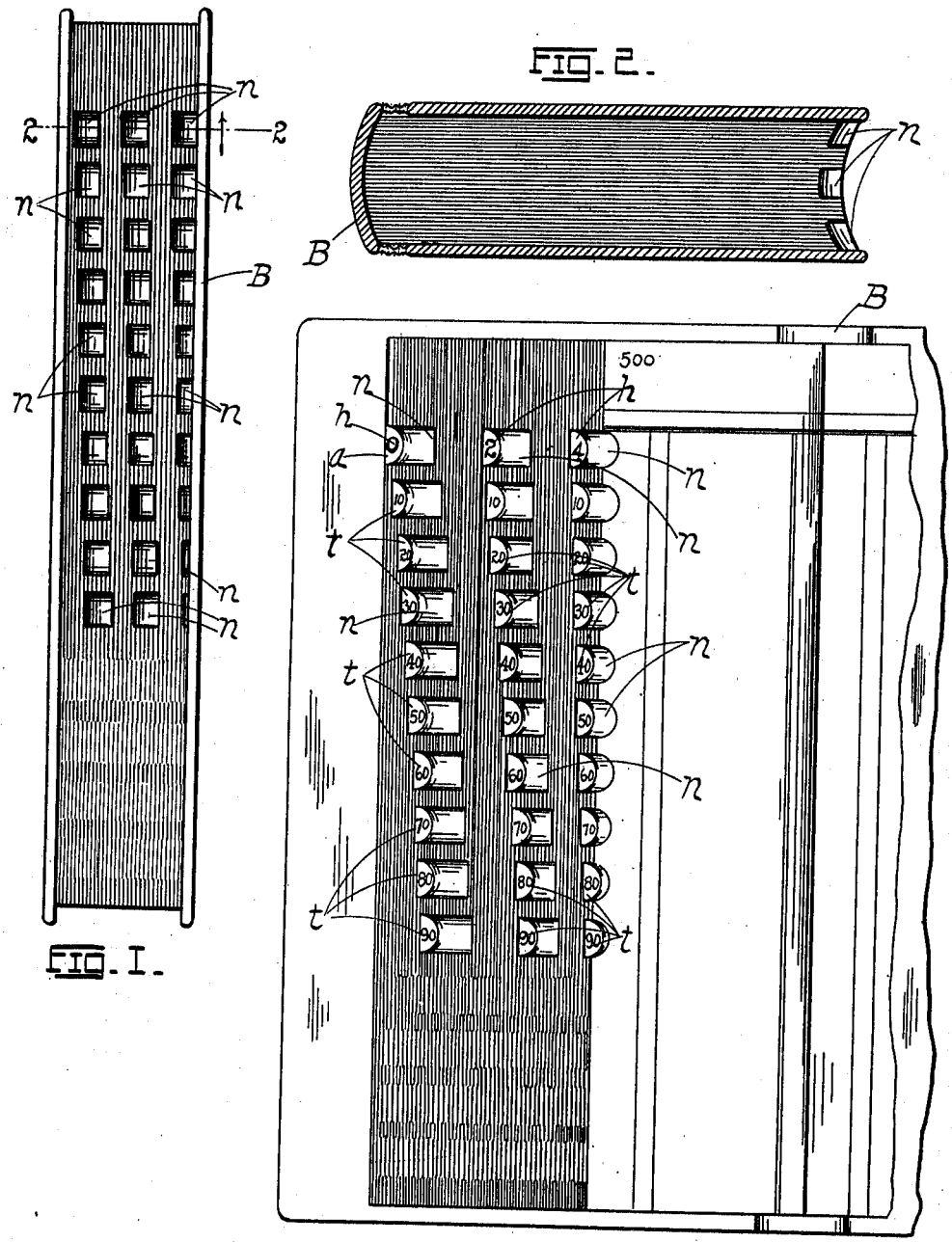

993,689.

Patented May 30, 1911.
3 SHEETS—SHEET 2.

WITNESSES:

INVENTORS.
Wm. Henry Jones
Buren Holmes.
BY
ATTORNEY.

W. H. JONES & B. HOLMES.
BOOK INDEX.
APPLICATION FILED JULY 18, 1910.

993,689.

Patented May 30, 1911.

3 SHEETS—SHEET 3.

WITNESSES:
Harry A. Reimes
Alonzo W. Powell

INVENTORS.
Wm. Henry Jones and
Buren Holmes.
BY
ATTORNEY.

UNITED STATES PATENT OFFICE.

WILLIAM H. JONES AND BUREN HOLMES, OF ST. LOUIS, MISSOURI.

BOOK-INDEX.

993,689.

Specification of Letters Patent. Patented May 30, 1911.

Application filed July 18, 1910. Serial No. 572,642.

*To all whom it may concern:*

Be it known that we, WILLIAM HENRY JONES and BUREN HOLMES, citizens of the United States, residing at St. Louis, State of Missouri, have invented certain new and useful Improvements in Book-Indexes, of which the following is a full, clear, and exact description, reference being had to the accompanying drawings, forming a part hereof.

Our invention has relation to improvements in book-indexes; and it consists in the novel construction of index more fully set forth in the specification and pointed out in the claims.

Figure 4:
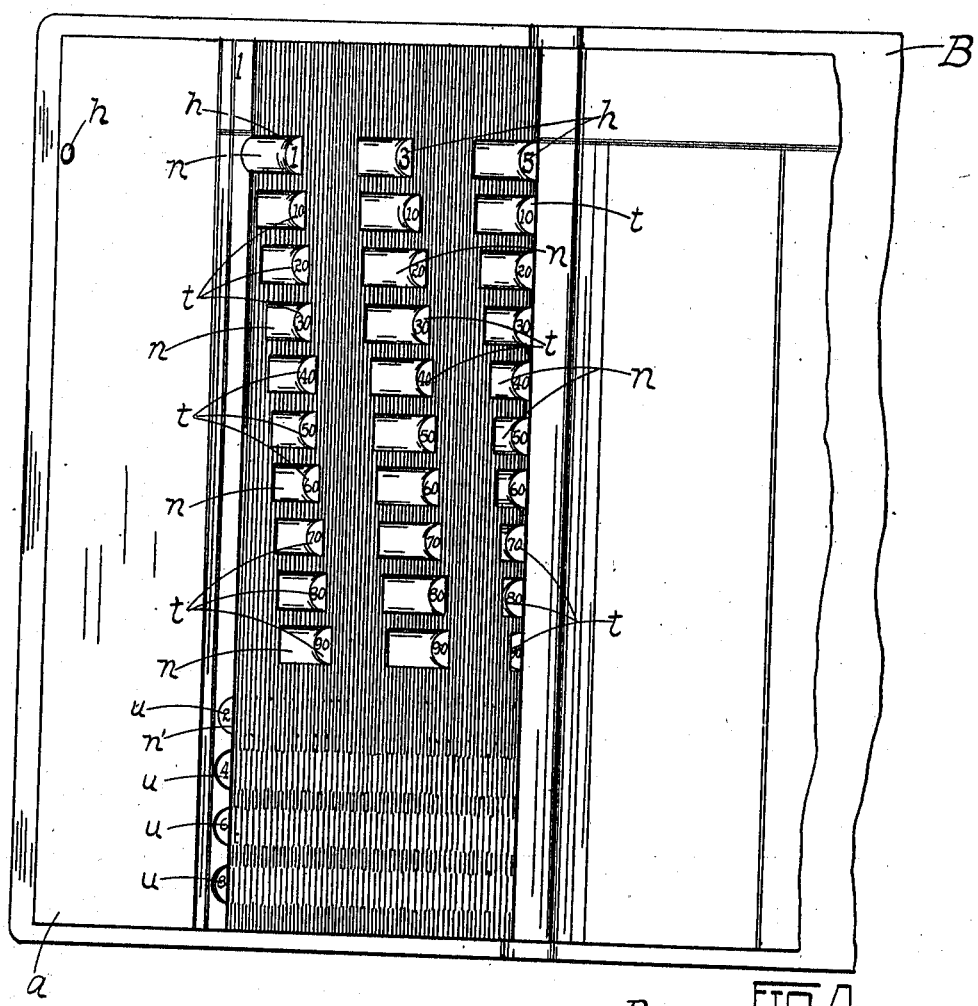
Figure 5:
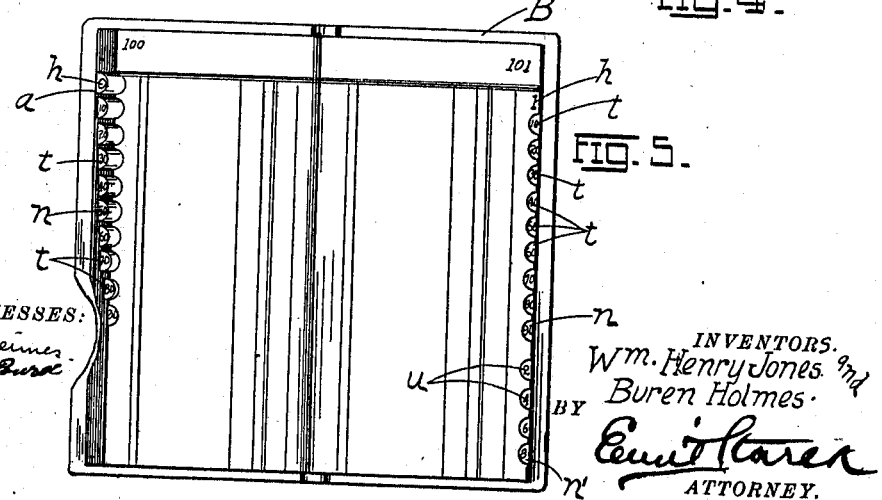
Figure 6:
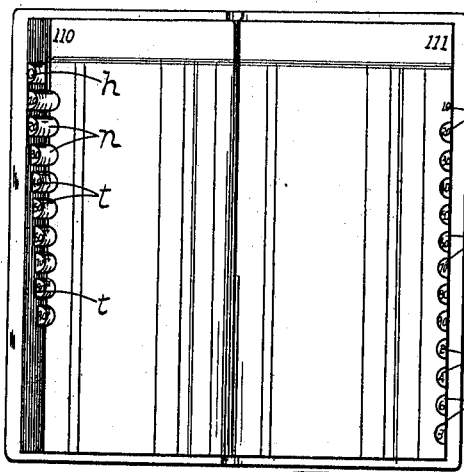
Figure 7:
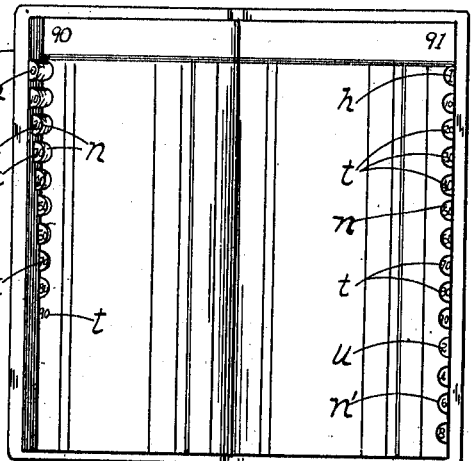
Figure 8:
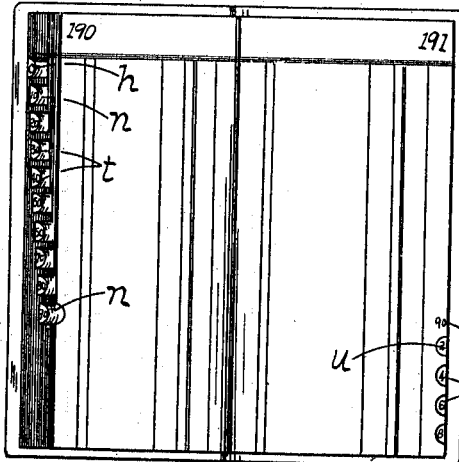
Figure 9:
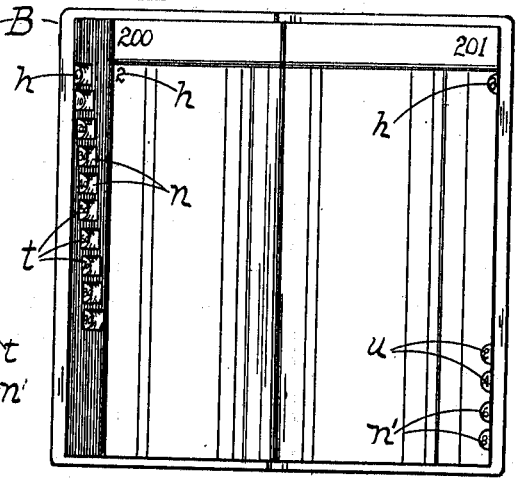
Figure 10:
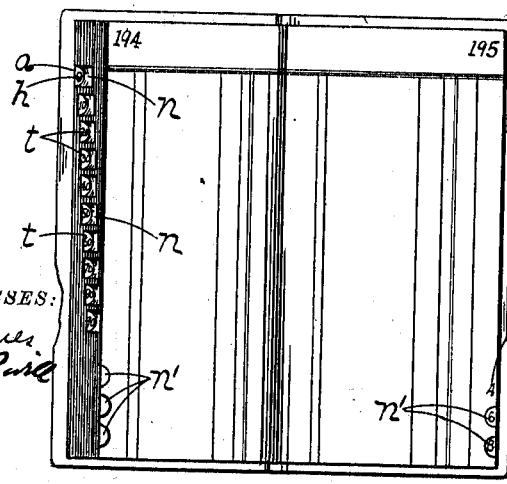

In the drawings, Figure 1 is a front view of a book closed showing our invention applied thereto; Fig. 2 is a cross-section on the line 2—2 of Fig. 1; Fig. 3 is a front view showing the book practically closed but with its free edges flexed to the left; Fig. 4 is a view similar to Fig. 3 but with the leaves flexed to the right; Fig. 5 is a plan of the book opened to pages 100-101; Fig. 6 is a plan of the book opened to pages 110-111; Fig. 7 is a similar view with book opened to pages 90-91; Fig. 8 is a similar view with book opened to pages 190-191; Fig. 9 is a similar view showing book opened to pages 200-201; and Fig. 10 shows the book opened to pages 194-195.

The present invention is specially directed to indexing books of account where the pages are numbered consecutively and where the number of pages is at least one hundred, or some multiple thereof. The invention takes advantage of the decimal system of subdivision, the complement of leaves constituting any tens subdivision of a given hundred, and the individual or unit leaves of such complement being identified by an index (on the edges or margins of the leaves) the specific disposition of which constitutes the subject matter of the present invention.

The object of the invention is to so dispose the index symbols or numbers respectively indicating primary hundreds divisions, secondary tens divisions, and tertiary units divisions, in such a way, and relatively to the notched edges of the leaves, as to enable the accountant or other person having occasion to consult the book, to turn to a given page with not exceeding two motions, the first motion serving to open the book to the tens subdivision of any given hundred, and the second motion to turn to any particular page of such tens subdivision.

The invention in detail may be described as follows:

Referring to the drawings, B, represents an account book, in the present illustration containing not less than five hundred (500) pages numbered consecutively from page 1, up, and provided with a spare index leaf *a* opposite the first numbered page, (page 1). Marked at a convenient point adjacent the free left-hand edge of said spare leaf *a* (which necessarily brings such mark on the second page of said leaf) is the symbol or main division mark (zero) 0 (marked by reference letter *h*) indicating the beginning of the first hundreds division (or first hundred pages of the book). This symbol or figure is readable, from the left, and access thereto is afforded to the thumb of the left hand, through the top series of notches *n* formed in the edges of the entire complement of leaves (fifty in number) forming the first one hundred pages (Figs. 1, 3). On the tenth (left hand) page of the first five leaves of said complement, below figure 0 and at a suitable distance therefrom, and adjacent the free edge of the page is the figure 10 (marked *t*) indicating the first tens subdivision of such first hundreds division, said figure 10 being accessible and readable in the same way through the second series of notches *n* formed in the edges of the remaining forty-five leaves forming the remaining ninety pages of the first hundred. And so, in the same manner every tenth page is marked with its proper figure 20, 30, 40, 50, 60, 70, 80, 90 respectively, each figure representing a tens (*t*) subdivision of the first hundred, the number of leaves notched, progressively decreasing by five for each tens subdivision, until, opposite the figure 90, only five leaves are notched to afford physical and visual access to said figure.

For the first hundred pages, the index figures *h*, *t* are readable from the left as already explained. In the present form of our invention the index figures of the second hundred are made readable from the right; those of the third hundred from the left; those of the fourth hundred from the right, and so on, every second hundred (so far as the hundreds and tens indexes are concerned) being readable from opposite directions. This arises from the fact that the last page of the first, third, fifth and any alternate odd hundred being notched to accord access to the index figure representing the hundreds division with which such page is identified, has no place on which to mark the hundreds division for the second hundred pages. It arises from the further fact that no spare leaf is inserted between pages 100 and 101 (300 and 301, 500 and 501 and so on) on which the main division $h$ for the second (fourth, sixth, and so on) hundred may be indicated. So that the first page (101) of the second hundred is availed of to carry its own hundreds figure, 1 (marked $h$) to designate the end of the first hundred pages (or what amounts to the same thing the first page of the second hundred). Necessarily, physical and visual access is had to this figure through the top series of notches $n$ formed in the first fifty leaves (one hundred pages) or those identified with the first hundred pages, and as obvious from the drawings (Figs. 1, 2, 4) this figure (hundreds 1) is readable from the right. Like the leaves of the first hundred pages, those of the second hundred are progressively notched every fifth leaf (or every tenth page up to ninety) to successively expose the secondary tens divisions $t$ (10, 20, 30, 40, 50, 60, 70, 80, 90) marked on the right hand free edges of the leaves in transverse alinement with the corresponding notches of the first hundred pages, except that the progression in the notching of this second hundred pages is reverse to that of the first hundred. This flows from the fact that this second hundred are read from the right. Thus for example (Fig. 5) if we begin with page 101 and desire to turn to page 110, the notch $n$ which accords access to said page cuts through only the first five leaves of the second hundred (pages 101–110 inclusive) the figure 10 ($t$) of the first tens subdivision being printed on page 111 (Fig. 6). If we desire to turn to page 190, the notch $n$ which accords access to the tens index 90 cuts through forty-five leaves (ninety pages, 101–190 inclusive) of said second hundred, the figure 90 being printed on page 191, (Fig. 8). It may be stated in passing that the tens index figures $t$ of the second hundred (and every even hundred thereafter) do not really index or identify the page on which they are printed, but the page opposite thereto, although the page identified is always on the same side (left side) when the book is opened. Thus, the tens index ($t$) 90 on page 90 (Fig. 7) identifies a page (90) which is on the left of the open book, and the tens index ($t$) 90 on page 191 (Fig. 8) identifies the opposite page (190) which is likewise on the left of the open book. All this flows from the fact that such alternate set of hundred pages are read, and access to their main and secondary indexes is had, from opposite directions, viz., from left to right, and then from right to left and so on. Since the notch $n$ opposite the 90 tens index $t$ of the second hundred (Fig. 8) accords us access to the last ten pages of said second hundred, these pages (except for the notches identified at the bottom of the book with the unit or tertiary subdivisions) are not notched, this leaving the edge of page 200 (Fig. 9) to carry the main index figure "2" (marked $h$) to indicate the end of the second hundred pages (or what amounts to the same thing the beginning of the third hundred). This page (200) therefore subserves the function of the spare index page $a$ which carries the zero figure "0" to designate the beginning of the first hundred pages, making it possible for every subsequent tens index figure $t$ (of this third hundred) to index or identify its own page because readable from the left Fig. 3, (and not the page opposite as was the case with the second hundred the tens indices of which are readable from the right of the open book). The notching of the third hundred pages (third fifty leaves) is again progressively in the same direction as that of the first hundred; that of the fourth hundred being progressively in the same direction with the second hundred and reverse to that of the third hundred, and so on indefinitely depending on the number of pages in the book. The present example illustrates a few pages over five hundred, the primary and secondary index figures $h$ and $t$ and their notches bearing the definite relation as already outlined, but which may at this point be emphasized to be as follows: The notches $n$ which permit the figures $h$ and $t$ not only to be read, but which afford access to the thumb of the reader for singling out the page corresponding to any hundreds division $h$ or tens subdivision $t$ are arranged longitudinally along the front free edges of the leaves to expose the various index figures in succession, the main and secondary index figures ($h$ and $t$) of any hundred pages and their notches being additionally arranged in transverse alinement with the corresponding figures and notches of the complement of leaves forming the next or adjacent hundred pages, so that by a slight flexion or bending of the free edges of the leaves of the book in one direction, the primary index symbols or figures $h$ ("1", "3", "5") indicating respectively the endings of the first, third, and fifth hundreds division, (or beginnings of the second, fourth, and sixth hundreds) as well as their secondary decimal subdivisional indexes $t$ (10, 20, 30 and so on) may be read at a glance across the book, looking to the right (Fig. 4); and by a flexion of the leaves in the opposite direction, we may equally read at a glance the primary index figures "0", "2", "4", indicating respectively the beginnings of the first, third, and fifth hundreds division (or beginning of the first hundred, and ending of the second and fourth hundreds) and their secondary index figures $t$ (10, 20, 30 and so on) by looking to the left (Fig. 3), so that by bending (if necessary) the edges of the book slightly, the eye can instantly catch the index to any main or hundreds division and to its corresponding tens subdivision, and by placing the thumb upon the index so detected, the book can be instantly and with a single movement, opened to any hundred, and its desired tens subdivision. It now remains to turn to the proper unit or tertiary page of any given tens or secondary division under any hundreds division. This is simple: It will be observed that the rows of figures heretofore alluded to ($h$, $t$) and the notches $n$ by which they may be singled out do not exhaust the full length of the pages. This leaves room for cutting a secondary set of notches $n'$ beyond the notches $n$ from the edges of four leaves of the complement (of five) forming any ten pages. The number of notches $n'$ in the first leaf of this unit series is four; three in the second; two in the third; and one in the fourth (Figs. 5, 10). The second leaf has marked thereon the unit index "2" ($u$) exposed through the notch of the first leaf; the third leaf has the index "4" in position to be exposed through the alining notches of the first and second leaf; the fourth leaf has the index "6" in position to be exposed through the alining notches of the first, second and third leaves; and the fifth leaf has the index "8" in position to be exposed through the alining notches of the first, second, third and fourth leaves. When therefore the reader or book keeper has turned for example to page 190 as previously described, and desires to turn for example to page 195 (Fig. 10) he simply runs his thumb to the notch opposite the unit index or division mark "4" enabling him to turn two leaves (to the left) thus exposing page 195 which is the page on which the unit index "4" is printed. Since the "4" corresponds to the unit denomination of the opposite page 194, it follows that by turning to page 195, page 194 will likewise be exposed. The unit index figures $u$ are all on the right hand pages of the several leaves, so that they are always readable on the right (that is, by turning the head to the right), the leaves singled out at any unit notch $n'$ being turned to the left to expose the unit page sought. Of course, the unit divisions $u$ and the notches $n'$ leading thereto need not necessarily be on the same edge with the main and secondary divisional indexes $h$ $t$, for obviously they might be placed along the top or bottom edges of the book. It will be noticed that the index figures $h$ and $t$ are exposed for a closed position of the book, while the figures $u$ are only exposed upon opening of the book. Where a book does not contain an integral number of hundreds of pages, the last primary index figure $h$ may of course represent the fraction of the last hundred left incomplete. In the present case the end of the fifth hundred, or the beginning of the sixth hundred which latter hundred may not be actually complete.

Having described our invention what we claim is:

1. A book containing a plurality of leaves divided into series of one hundred pages each, and having a spare leaf in front of the first hundred provided with a marginal primary index figure readable from the left and marking the beginning of the first hundred, a succession of secondary figures from 10 to 90 on the margin of every tenth page marking the beginning of corresponding tens subdivisions of said hundred, marginal notches formed in the entire complement of fifty leaves forming said hundred pages at a point opposite the primary index figure, similar notches in the leaves following the pages bearing the secondary index figures, the number of leaves notched decreasing progressively downward from the first to the ninth secondary index figure, the margin of the first page of the second hundred bearing a primary index figure at a point opposite the notches formed in the first fifty pages opposite the primary index figure in the spare leaf aforesaid, the said second primary index figure being readable from the right and identifying the beginning of the second primary hundreds division, a succession of secondary index figures from 10 to 90 readable from the right and disposed on the margin of every tenth page and transversely in line with, or opposite to, the secondary index figures of the first hundred pages, marking the beginnings of corresponding tens subdivisions of said second hundred, marginal notches formed in forty-five leaves of the complement making up the second hundred pages opposite the pages bearing the respective secondary index figures, the number of leaves notched increasing progressively downward from the first to the ninth secondary index figure of said second hundred, the margin of the last page of the second hundred bearing a primary index figure at a point transversely in line with the primary index figure in the first page of said second hundred aforesaid, said third primary index marking the ending of the second hundred pages and readable from the left and corresponding in relative position to the primary index marking the beginning of the first hundred pages, the indexing for the third and fourth, fifth and sixth and all subsequent hundreds being identical with the indexing of the first two hundred pages, the exposed index figures for the first, third, fifth and so on hundred being readable from the left, while the corresponding index figures of alternate hundreds and their secondary subdivisions are readable from the right.

2. A book containing a plurality of leaves divided into series of one hundred pages each, and provided with marginal index figures to mark the beginning of each hundred pages, every tenth page of ninety pages of each hundred bearing correspondingly placed figures to mark the beginning of every tens subdivision of its respective hundred, the edges of the leaves being notched at points opposite the respective index figures, the latter being marked on the left hand edges of the pages for the first, third and every odd hundred, and on the right hand edges of the pages of the second, fourth and every even hundred, and the notches of the several hundreds being disposed in relative transverse alinement whereby a page of any hundred of the first, third, fifth and so on hundred may be instantly singled out by a reading of the marginal indexes from the left, and any page of the second, fourth, sixth and so on hundred may be singled out by a reading of the indexes from the right.

3. A book composed of leaves forming complements of two successive main divisions, a spare leaf in front of the complement forming the first division provided with a marginal index symbol marking the beginning of said division, the edges of the leaves of said first complement being notched to expose the symbol aforesaid, the first page of the second complement bearing an index symbol of a similar division opposite the same notch and exposed therethrough but readable from the opposite direction to that of the first symbol, and marking the beginning of the second division.

4. A book composed of leaves forming complements of two successive main divisions, a spare leaf in front of the complement forming the first division provided with a marginal primary index symbol marking the beginning of said division, the edges of the leaves of said complement being notched to expose the symbol aforesaid from the left, the first page of the second complement bearing an index symbol of a similar division on the opposite side of the notch and exposed therethrough from the right, the pages of the respective main divisions being marked to indicate the beginnings of predetermined subdivisions, the edges of the leaves being notched to permit the reading of the markings of said subdivisions from the same directions as the reading of the index symbols of the main divisions of the complements of leaves aforesaid.

In testimony whereof we affix our signatures, in presence of two witnesses.

WILLIAM H. JONES.
BUREN HOLMES.

Witnesses:
EMIL STAREK,
ALONZO W. POWELL.

---

Copies of this patent may be obtained for five cents each, by addressing the "Commissioner of Patents, Washington, D. C."